Feb. 11, 1969
C. S. McARTHUR ET AL
3,426,583
CIGARETTE INSPECTION APPARATUS
Filed May 23, 1966
Sheet 3 of 3
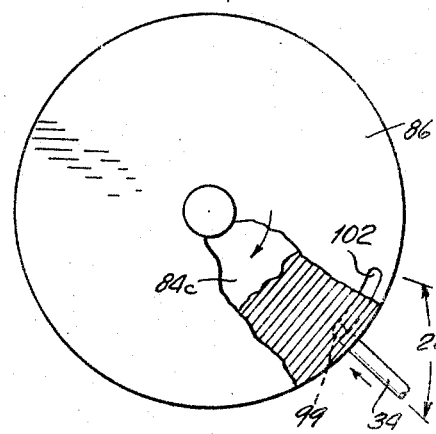
Fig. 6.
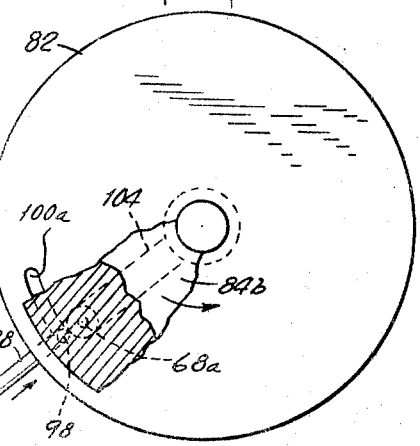
Fig. 7.
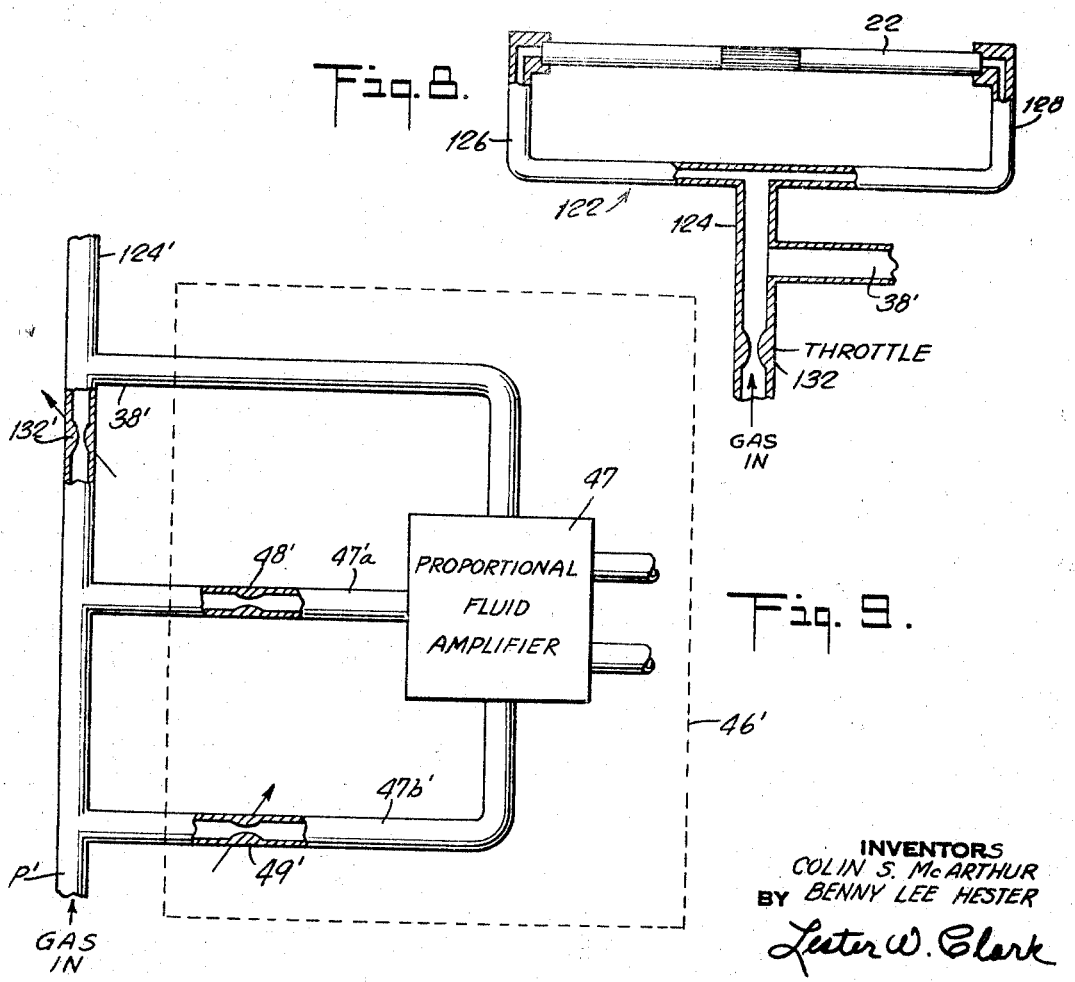
INVENTORS
COLIN S. McARTHUR
BY BENNY LEE HESTER
Lester W. Clark
ATTORNEY United States Patent Office 3,426,583
Patented Feb. 11, 1969

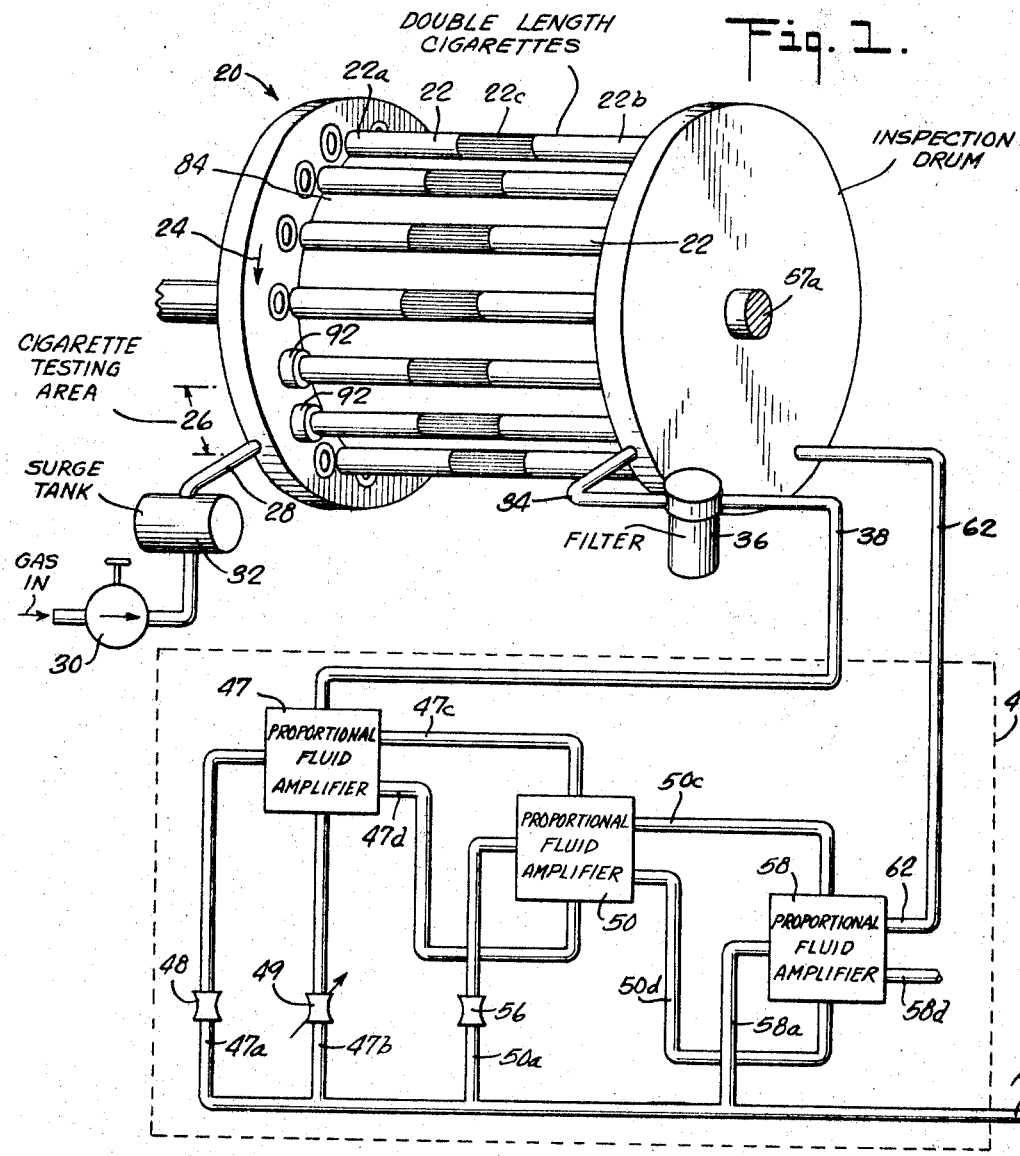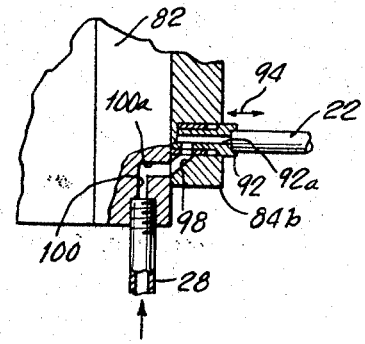

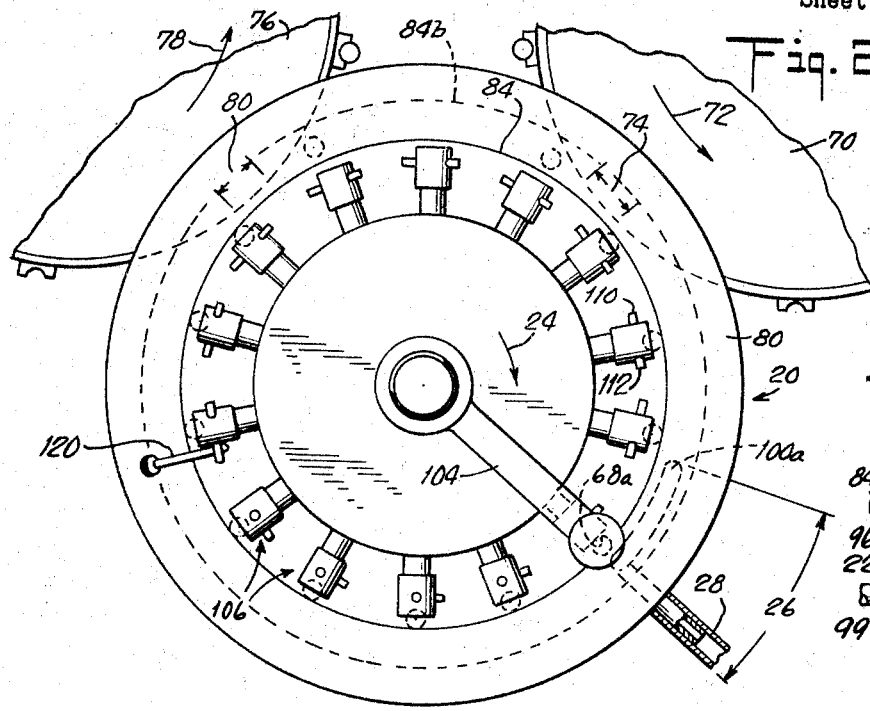
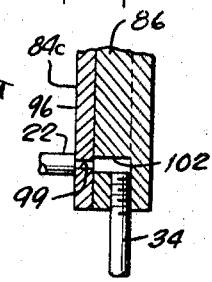
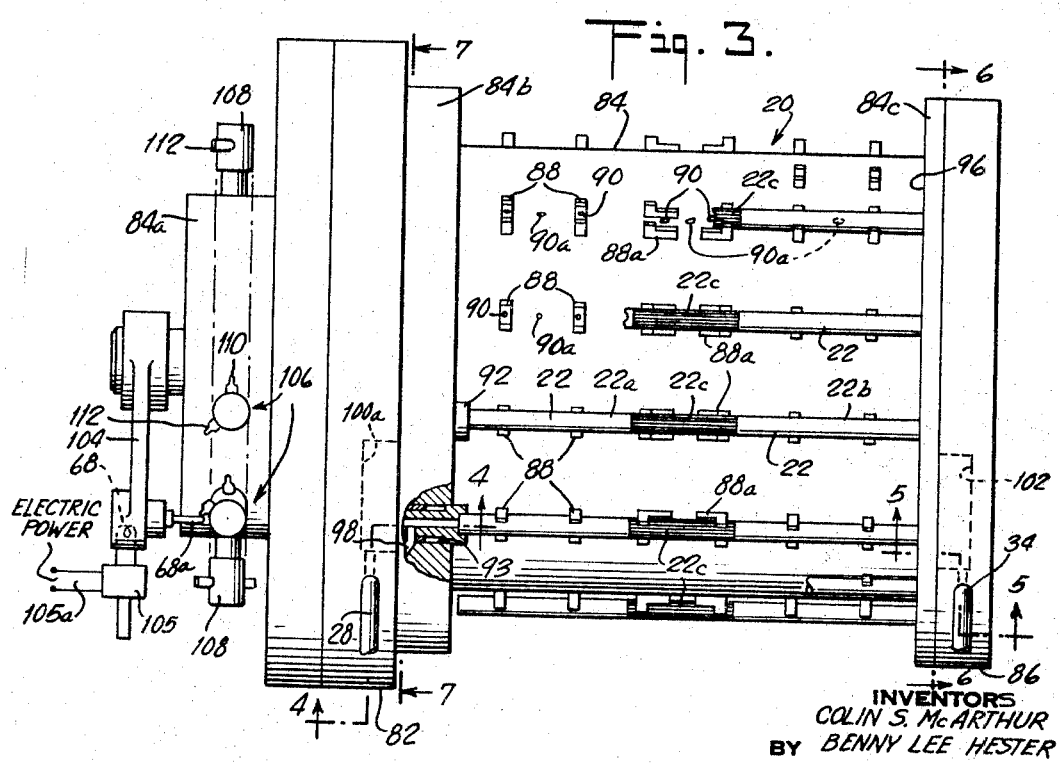

3,426,583
CIGARETTE INSPECTION APPARATUS
Colin Shaw McArthur and Benny Lee Hester, Winston-Salem, N.C., assignors to R. J. Reynolds Tobacco Company, Winston-Salem, N.C., a corporation of New Jersey
Filed May 23, 1966, Ser. No. 552,050
U.S. Cl. 73—45.1  4 Claims
Int. Cl. G01m 3/04

ABSTRACT OF THE DISCLOSURE

Apparatus for testing cigarettes for leaks, especially at the connection between the filter and the tobacco section, including a testing station extending along a path for moving cigarettes, means for moving cigarettes one at a time through the station, means for subjecting each passing cigtrette to an internal-external pressure difference, proportional fluid amplifier means for sensing that difference, and accept-reject mechanism adjacent the downstream end of the station for removing from the path cigarettes having a pressure difference outside a predetermined range.

Cross-reference

This application is directed to an improvement on the cigarette testing apparatus shown in the copending application of McArthur and McKnight, Ser. No. 551,162, filed May 18, 1966.

This invention relates to the inspection of cigarettes, and more particularly relates to the inspection of cigarettes for imperfections causing air leaks therein.

Sherrill Patent No. 2,951,364 shows an apparatus for inspecting cigarettes for air leaks by passing a flow of air through each cigarette. A mechanical sensing device incorporating a movable member responds to an abnormal air flow, thereby indicating a leak in the particular cigarette under inspection. In response to movement of the movable member, an ejector mechanism is actuated to eject the defective cigarette. Although mechanical sensing arrangements for detecting abnormal air flow conditions have been suitable in the past, they are slow as compared to the speeds available in present cigarette-making machines and the even greater speeds expected in future machines. It is therefore desirable to have an inspection arrangement for leak detection that can handle cigarettes at the fast rate at which they may now be produced.

It is an object of the present invention to provide an apparatus for the improved inspection of cigarettes for leaks.

Another object of the present invention is to provide for the high speed inspection of cigarettes for leaks.

Another object of the invention is to provide an apparatus for the inspection of cigarettes for leaks employing fluid principles to achieve high speed response of a rejection mechanism to an inspection mechanism.

These and other objects and advantages of the invention will be more apparent as the detailed description of one presently preferred but merely illustrative embodiment of the invention proceeds, with reference to the drawings, in which:

FIG. 1 illustrates an inspection apparatus embodying the invention, having mechanical parts shown in a simplified perspective view and proportional fluid amplifier means parts shown in a simplified diagrammatic view;

FIG. 2 is an end view of a cigarette-conveying apparatus incorporating one form of means for subjecting the cigarettes to a source of gas for inspection for leaks;

FIG. 3 is a side view of the apparatus of FIG. 2;

FIGS. 4, 5, 6, and 7 are sectional views of portions of the apparatus shown in FIG. 3, taken along the section lines 4—4, 5—5, 6—6, and 7—7 of FIG. 3 and looking in the directions of the corresponding arrows in that Figure;

FIG. 8 is a simplified view of a second form of means for subjecting the cigarettes to a source of gas for inspection; and FIG. 9 is a partial view of an alternative circuit arrangement for powering the proportional fluid amplifier means from the same source as supplies the gas for inspection of leaks in the cigarettes.

As employed herein, the term "cigarette" is a generic term inclusive of a filter cigarette or a non-filter cigarette, as well as a single length or multiple length cigarette. The term is also intended to include any self-contained smoking article, such as a cigar, which may be tested in accordance with the invention.

Briefly, the present invention provides a leak inspection system wherein gas at an elevated or reduced pressure is applied to each of a succession of cigarettes, and the change in pressure attributable to leaks in the cigarette controls proportional fluid amplifier means so as to divert the output of said means from a first outlet to a second outlet in proportion to the change in pressure, said second outlet being arranged to actuate means for ejection of the leaky cigarette in question when a predetermined amount of output appears in the second outlet.

The apparatus according to the invention provides very fast response between testing and ejection. This is important because with present day cigarette-making machines approximately 1000 dual cigarettes per minute, or 17 dual cigarettes per second, are handled. This means that the testing and ejection mechanism has to be extremely rapid, e.g. it must test about 17 dual cigarettes per second and reject the leaky ones. Because of this rapid cigarette handling rate, the apparatus must also be extremely reliable, because in even a momentary mechanical break-down a rapid build-up of untested cigarettes or cigarettes which have been incorrectly rejected would occur. The apparatus according to the invention meets the felt need, because, operating upon fluid principles, it is extremely rapid in response and it is extremely reliable, both principally because there is no inertia involved except that of the fluid, which being a gas typically, is extremely low in mass and accordingly in inertia.

Referring to FIG. 1, a conveyor such as a drum assembly 20 is shown carrying a plurality of double length cigarettes 22 thereon, each of which is to be inspected for leaks. Each dual cigarette typically comprises tobacco-filled portions 22a and 22b at the ends thereof separated by a double length filter section 22c in the middle thereof and fastened together by means of tipping paper and adhesive. Subsequently, each double length cigarette is cut in the middle of filter section 22c to produce two standard filter-type cigarettes. The cigarettes are applied to, carried by, and removed from the drum assembly 20 by means presently to be described. The drum assembly 20 is represented only diagrammatically in FIG. 1; it is shown in more detail in the other figures.

The drum assembly rotates as shown by arrow 24. As each cigarette carried on the drum assembly passes through a testing zone 26, gas (typically air) under constant pressure greater than ambient pressure is applied to the cigarette from a conduit 28. It is possible, but not preferred, to use a constant vacuum system instead of an elevated pressure system. With a vacuum the leak pressure-pulse is positive-going, with an elevated pressure (as illustrated) it is negative-going. In one form of the invention, the conduit 28 is connected to a source of gas under pressure (not shown) through a regulator 30 and a surge tank 32 to maintain the flow of gas constant. A slip ring arrangement described in detail in connection with FIGS. 2 and 3 couples the conduit 28 to each cigarette as it passes through the testing zone 26.

Gas flows through the cigarette in the testing zone and out of the cigarette and into an outlet conduit 34 connected to a filter 36. The filter filters out any tobacco that may be present in the gas. The gas is then led, by a conduit 38, to fluid amplifier means shown in the lower half of FIG. 1 within the broken line envelope 46. Means 46 operates on proportional fluid amplifier principles, that is to say, the fluid input from conduit 38 controls the fluid output from means 46, so that the output is diverted to a second destination from a first destination in response to the change in level of fluid input pressure at conduit 38. The second destination is to the rejection means for the cigarettes, and the first destination is an exhaust. Reference to the proportional nature of means 46 refers to the fact that there is a direct relationship between control input and second outlet output, not that there is strict proportionality between control input change and second outlet output change in response thereto.

The fluid amplifier means 46 comprises a first proportional fluid amplifier 47, a second proportional fluid amplifier 50, and a third proportional fluid amplifier 58. While a three stage amplifier 46 is thus illustrated, it is a feature of the invention that one or more stages, as required, may be employed. The object is to have a final output pressure of the desired intensity to operate the rejection means, and the amplification factor of each amplifier will be chosen along with the number of stages to achieve that final pressure, or more. Since, as will presently appear, no resetting of proportional fluid amplifiers is necessary, multiple stages do not require proportionately complex resetting circuitry and components. This is an important advantage.

A power source conduit P, in this first form being separate from the source applied to the cigarettes at conduit 28, applies a power stream to amplifiers 47, 50, 58 at branches 47a, 50a, 58a respectively. In branches 47a and 50a are restrictors 48 and 56 respectively, restrictor 48 causing a greater pressure drop than restrictor 56. No restrictor appears in branch 58a, and accordingly the power stream of amplifier 58 is of higher pressure than that of amplifier 50, which in turn is of higher pressure than that of amplifier 47. A bias branch 47b supplies pressure to one control port of amplifier 47, through a variable restrictor 49. The characteristics of the rejection means, hereinafter described, together with the setting of restrictor 49 determine the level of input into means 46 at input conduit 38 that will cause rejection of a cigarette under test. Viewed from the standpoint of the terminals of means 46, the restrictor 49 alone sets the adjustment of the response at output conduit 62 from a given input at input conduit 38. Amplifier 47 is the detector of means 46, as well as an amplifier.

Input conduit 38 supplies the other control input of amplifier 47, i.e. other than that supplied by branch 47b. The interplay of the relatively pressures at branch 47b and input conduit 38 determines the proportion of the power stream from branch 47a that passes to a first output outlet conduit 47c and the proportion that passes instead to a second output outlet conduit 47d, in accordance with well known proportional fluid amplifier principles. Conduits 47c, 47d supply the control inputs of amplifier 50, and first and second output outlet conduits 50c, 50d thereof in turn supply the control inputs of amplifier 58, which in the illustrated three stage means 46 is the output stage amplifier. Amplifier 58 has a first output outlet conduit 58d which is exhausted, and a second output outlet conduit 62 which leads to the rejection means at drum 20, as aforesaid.

The arrangement is such that when a negative-going pulse (indicating a leak) in the positive pressure within a cigarette under test is received at conduit 38, the output of amplifier 47 shifts more into output conduit 47c at the expense of output conduit 47d. The degree of shift of proportions of course depends upon the intensity of the negative-going input signal. The total value of pressure in output conduit 47c after the shift (as distinct from the amount of shift itself) is determined by bias branch 47b, as aforesaid. The increase in conduit 47c at the expense of conduit 47d drives the higher output of amplifier 50 more to conduit 50d at the expense of conduit 50c. This in turn drives the still higher output of amplifier 58 more into output conduit 62 at the expense of exhaust outlet conduit 58d. With an amplification factor of about 4.5, a three stage amplifier produces about ninety times the positive gage pressure at outlet 62 as was imposed as a negative-going pressure difference at input conduit 38. As soon as the signal is off input conduit 38, the means 46 reverts to normal, i.e. the output of amplifier 58 shifts away from conduit 62 and toward exhaust conduit 58d, under re-establishment of the balance between the pressure of branch 47a on amplifier 47 and the normal pressure at input conduit 38.

Viewed at its terminals therefore, fluid amplifier means 46 has a power stream introduced from power conduit P, and this power stream is controlled by the pressure signals arriving at input conduit 38 from cigarettes under test. The testing of a leaky or an acceptable cigarette will be represented by the pressure in input conduit 38 and will, respectively, cause proportional diversion of the power stream derived from power source conduit P into conduit 62 to eject that cigarette, or into exhaust to leave that cigarette as is.

FIGS. 2–7 show in greater detail the construction of a drum assembly 20 shown in diagrammatic form in FIG. 1. Drum 20 employs valves to eject the rejected cigarettes by the valving on of positive air pressure, the valves being turned to the "on" condition by a pressure switch 105 operated by output conduit 62. In FIG. 2, the drum assembly 20 is adapted to receive a series of cigarettes from a drum assembly 70. The drum assembly 20 rotates clockwise, as shown by arrow 24, while the drum assembly 70 rotates counterclockwise, as shown by arrow 72. The surfaces of the drum assemblies pass tangentially adjacent to each other at a cigarette transfer zone 74, and cigarettes are transferred from the drum assembly 70 to the drum assembly 20, as described in greater detail below. The cigarettes transferred to the drum assembly 20 are thereafter tested as they pass through the testing zone 26 and are either rejected as being defective or are retained on the drum. Those cigarettes retained on the drum are thereafter transferred to a further drum assembly 76 which rotates counterclockwise as shown by arrow 78. Cigarettes are transferred to the drum assembly 76 in transfer zone 80, as described below.

As shown in FIG. 3, the drum assembly 20 comprises a fixed head 82 which serves to mount the drum assembly to a frame (not shown). Journalled within the head 82 is a rotatable drum 84 which extends at one end through the fixed head 82 as a reduced diameter portion 84a. The drum 84 also includes an intermediate stepped portion 84b and an end flange 84c. Another fixed head 86 abuts the end flange 84c.

The drum 84 carries a plurality of rows of cradles 88 therein, the rows being arranged around the circumference of the drum upon its outer surface. Each cradle 88 is advantageously concave and semicylindrical so as to cradle a portion of the cylindrical surface of one of the cigarettes 22 carried on the drum. The central pair of cradles 88a in each row receive the cylindrical surface of substantially the entire filter portion 22c of the double length cigarette in the row.

Each cradle 88 has a central orifice 90 opening underneath the cigarette in the cradle. Each of the central elongated cradles 88a has a pair of such orifices. Orifices 90a are also included in the drum 84 in each row of orifices 90. Internal passageways (not shown) within the drum 84 selectively connect (by appropriate valve action) the orifices 90a to a positive source of gas (typically air) pressure and the orifices 90 to a source of vacuum, by means of valve operators presently to be described. Thus each cigarette 22 on the surface of the drum 84 is either ejected from the cradles 88 by positive gas pressure applied to the orifices 90a or retained on the cradles by vacuum applied to orifices 90.

In this regard, the surfaces of the drum assemblies 70 and 76 are similarly formed with cradles and orifices to retain the cigarettes on or eject the cigarettes from the cradles. In the system of FIG. 2, as each cigarette on the drum 70 enters into the transfer zone 74, it is subjected to a positive gas pressure ejecting that cigarette from the cradles on that drum onto the cradles of the drum 84. At the same time, the orifices 90 in the cradles 88 on the drum 84 within the transfer zone 74 are subjected to a vacuum to receive the cigarette from the drum 70 and to retain the transferred cigarette on the surface of the drum 84. In like fashion, orifices 90a on the drum 84 when in the transfer zone 80 are subjected to positive gas pressure and the orifices in the cradles on the drum 76 are subjected to vacuum to transfer cigarettes from the drum 84 to the drum 76.

As shown in FIGS. 3 and 4, the intermediate stepped portion 84b of the drum 84 includes a plurality of holders 92. Each holder is mounted within a corresponding passage 93 and may be reciprocated in the directions indicated by arrow 94 (FIG. 4) by a driving mechanism (not shown) in the drum 84. When a cigarette is transferred from the drum 70 to the drum 84 as described above, the holder 92 on the drum 84 positioned in the transfer zone 74 is in a retracted position within the drum portion 84b. After the cigarette is transferred to the drum 84, the holder 92 is moved outwardly to the position shown in FIGS. 3 and 4 to engage one end of the cigarette 22 transferred to the drum 84. In so engaging the cigarette end, the cigarette is moved slightly to the right with respect to FIG. 3 so that the other end thereof is firmly engaged by surface 96 of the drum flange 84c (FIG. 5).

As shown in FIGS. 3 and 4, each cigarette holders 92 includes a passage 92a therein that communicates with a passage 98 in the drum portion 84b. Similarly, each contact area of the drum flange 84c (FIG. 5) engaging an end of a cigarette communicates with a passage 99 in the drum flange. It will be noted, then, that the passages 98 and 92a communicate with one end of the cigarette, and the passage 99 communicates with the other end of the cigarette. These passages are provided for subjecting the cigarette to a flow of gas for leak testing as described immediately below.

Gas input conduit 28 is shown in FIG. 3 as mounted on the fixed head 82. FIG. 4 shows that conduit 28 communicates with a passage 100 within the fixed head 82. The passage 100 terminates in a portion 100a that is shown in FIG. 7 as subtending an angle of roughly 25° of rotation of the drum 84. The angular extent of the passage 100a defines the extent of the cigarette testing zone 26. At the other end of the drum 84, as shown at the right-hand side of FIG. 3, the gas outlet conduit 34 is connected to the fixed head 86. As shown in FIG. 5, the outlet conduit 34 communicates with a passage 102 in the fixed head. As will be noted from FIG. 6, the passage 102 subtends the same angle as the passage 100a and is located directly opposite the passage 100a.

The passages 100a and 102 in the fixed heads 82 and 86 are positioned so as to communicate with the passages 98 and 99 in the drum portions 84b and 84c. Hence, during the portion of the revolution of the drum 84 in which the passage 98 leading to a particular cigarette holder 92 communicates with the passage 100a, gas under pressure is provided via the passages 28 and 98 to that cigarette. The gas flows through the cigarette and into the associated passage 99 in the flange 84c at the other end of the drum, and flows out of that passage into the passage 102 and thence into the outlet conduit 34 to the filter 36 and fluid amplifier means 46 shown in FIG. 1.

Thus as each cigarette passes through the testing zone 26, it is subjected to a flow of gas therethrough. If the cigarettes are all of uniform draft, both the flow of gas and the presure thereof will be constant. However, if any one of the cigarettes has a leak therein, the gas flow will leak out, thereby producing the aforesaid negative-going pressure signal for the duration of testing of that cigarette. In accordance with the presently discussed form of rejection means, the resultant flow in output conduit 62 will actuate relay 68, ejecting the leaky cigarette.

Referring to FIG. 3, the relay 68 is carried within a housing in arm 104. The relay controls a plunger 68a which, when the relay is energized, may actuate that one of a plurality of valve operators 106 which happens to be passing plunger 68a on the rotating drum portion 84a. The valve operators 106 control the application of vacuum to the orifices 90 and pressure to the orifices 90a so as to cause the cigarettes in the cradles to be retained upon the drum or to be ejected therefrom. Each of the valve operators 106 is associated with a corresponding one of the rows of cradles 88, and is rotatable on its own longitudinal axis. Each valve operator includes a spindle 108 to which are attached a pair of radial fingers 110 and 112.

The relay housing of arm 104 is so positioned and the relay plnger 68a has an axial movement of sufficient length so as to intercept any finger 112 passing by when the plunger 68a is in its extended position, but adapted to clear any finger 112 passing by when the plunger is in a retracted position. The setting of the valve operators 106 is undisturbed as the drum 84 rotates until an electrical signal to the relay 68 causes the plunger to be extended, as shown in FIG. 3, so as to intercept the finger 112 then in proximity to or next coming into proximity to the plunger 68a, thereby to rotate 90° the valve operator 106. The valving action of the valve operator 106 is such that the 90° turn thereof acts to switch the orifices 90 asociated therewith from a normal gas vacuum condition and to apply a positive gas pressure to the associated orifices 90a. This action tends to eject the associated cigarette from the cradles 88.

It will be noted from FIG. 7 that the relay plunger 68a is positioned at the bottom region of the testing zone 26. Hence each cigarette tested in the zone and detected as leaking, thereby cuasing the relay 68 to be actuated, is ejected from the surface of the drum 84 with gravity assisting air pressure. It should be noted in this connection that each of the cigarette holders 92 is moved to its retracted position after the cigarette has passed through the testing zone 26 so that the associated cigarette may be ejected following the test or may, if found acceptable, be transferred to the drum 76 as explained below.

Referring again to FIG. 2, a finger 120 is fixed to the head 82. The finger is adapted to intercept the finger 110 on any valve operator 106 that is not in the vacuum position. Hence each of the valve operators which has been actuated by the relay plunger 68a to eject its associated cigarette is moved to the vacuum position for proper operation in the next cycle of operation when a cigarette is again received from the drum 70 for testing.

Those cigarettes passing through the testing zone 26 and not ejected from the surface of the drum 84 continue to be retained on the drum until they reach the transfer zone 80 (FIG. 2). In the transfer zone 80, the vacuum supplied to the orifices 90 in the cradles 88 is temporarily removed by means of a valving arangement (not shown) so that the cigarettes may be transferred to the drum 76.

The aforesaid output of gas in output conduit 62 is advantageously employed (FIG. 3) to actuate relay 68 to eject the leaky cigarette. A pneumatic switch 105 (FIG. 3), preferably of the diaphragm type, is directly actuated by the pressure output from conduit 62 and thereby closes electrical contacts for the duration of that output, connecting electrical power leads 105a to relay 68. Many such switches are available that actuate upon 0.5 p.s.i.g. pressure change. A leak causing a drop of about two inches of water pressure, may for example, and typically, be considered grounds for rejection. In a back pressure system, that will reflect about 50% or about one inch of water pressure at input conduit 38. With only a two stage amplifier, wherein each stage has an amplification factor of about 4.5, the amplification of twenty fold will give about twenty inches of water at output conduit 62, which is appreciably in excess of the example 0.5 p.s.i.g. requirement for the pressure switch hypothesized. This can of course also be accomplished with more or less than two stages, depending upon the amplification factor and the switch involved.

Although the use of switch 105 and relay 68 introduces electrical and mechanical inertia into the rejection system, the improvement contributed by use of proportional fluid amplifier means 46 is so superior that this can be tolerated, especially in adapting pre-existing machines having a relay 68 and valve operators 106 to the present invention. Moreover, the amplification of the leak pulse by means 46 allows faster and more rugged mechanical or electrical rejection means to be employed, attenuating the disadvantage thereof. Also, the delay in the rejection means is actually advantageous, as explained immediately below.

With respect to FIG. 2, the angular extent of the testing zone 26 is preferably slightly less than the angular separation of adjacent rows of cradles 88 on the drum 84, so that after each cigarette passes out of the testing zone, there is a short period of time before the next cigarette enters the testing zone. With the proportional fluid amplifier means 46, output at conduit 62 commences as soon as a leaky cigarette enters testing zone 26. The relay plunger 68a need not respond however until the valve operator 106 associated with that cigarette reaches the other end of zone 26, where relay 68 is located. The time of traverse of the cigarette and its valve operator 106 through zone 26 is, in all cases, sufficient to allow the response time of pressure switch 105 and relay 68 to elapse, extending plunger 68a in the way of that valve operator 106. Similarly, the plunger 68a is easily retracted before the next valve operator 106 reaches it, and most importantly, need not be retracted if the next cigarette is also leaky—this being a result of the immediate response of the proportional amplifier at the start of the testing zone traverse. The proportional amplifier, responding to a test of a cigarette extending over a period of time, with the rejection means located at the end of the travel of the cigarette through the testing zone, is thus seen to be self-synchronizing. This is another important feature of the invention. Not only can prior existing machines be easily adapted to the present invention, but no external synchronizing means need be employed, thus reducing maintenance and increasing reliability.

As described above, the system of FIGS. 1–7 provides for a flow of gas through each cigarette. The fluid amplifier means 46 monitors the outlet line, and hence requires a filter to remove tobacco from the gas. It may be desirable, however, not to sense "dirty" gas that has passed through a cigarette, and the alternative embodiment of FIG. 8 is intended to operate by sensing "clean" gas prior to its application to the cigarette under test.

Referring to FIG. 8, gas under constant pressure is applied to a branched conduit 122. The common leg 124 of the conduit is connected to input conduit 38' which leads to fluid amplifier 46, while legs 126 and 128 are coupled to opposite ends of cigarette 22. Depending upon the imperviousness of the cigarette paper to the flow of gas therethrough, little or no pressure drop occurs at the common conduit leg 124 unless there is a leak in the cigarette. When there is a leak however, the negative-going pressure pulse is reflected at the input to the cigarettes at conduit 124, and accordingly is monitored by input conduit 38' to operate means 46 in the same manner as has already been described. The chief difference is that with the arrangement of FIG. 8, which may be practiced with any of the preceding forms of apparatus according to the invention, the gas fed to fluid amplifier means 46 is clean initially, so that a filter is not needed.

With reference to FIG. 9, there is shown an alternative means of powering the proportional fluid amplifiers. The conduit 124' corresponds to the conduit 124 of FIG. 8, and leads, if desired, to forked branches communicating with the two ends of a cigarette 22, as do branches 126, 128 of FIG. 8. However, the amplifier means 46' of FIG. 9 takes its power from power source conduit P' which also supplies gas to the cigarettes via conduit 124' for leak testing. This is accomplished by employing a throttle 132' in conduit 124', and connecting input conduit 38" on the low pressure side of throttle 132', both as also done in the arrangement of FIG. 8, but also taking the power branch 47a' off of the high pressure side of throttle 132' and taking the bias branch 47b' off that same side, Fixed restrictor 48' is employed in branch 47a, and variable restrictor 49' is employed in branch 47b', corresponding to restrictors 48 and 49 in fluid amplifier means 46 of FIG. 1.

By taking the power branch 47a' off of power source conduit P' which is also the source for the cigarette leak testing itself, and especially by taking the bias branch 47b' thereof, variations in the power source pressure are negated as to effect on rejection of cigarettes. The throttle 132' prevents pressure changes on the low pressure side thereof from affecting branch 47a' or branch 47b' appreciably. But whenever a variation in line pressure in source conduit P' would tend to change the power of the power stream from conduit 47a', or more importantly tend to change the bias from branch 47b', the reflection thereof on the low pressure side of throttle 132' will have an opposite effect when it, superimposed, appears at input conduit 38". This kind of arrangement can also be employed with the form of gas application shown in FIG. 1, so that power conduit P therein is taken off conduit 28 above a throttle therein (not shown), if desired.

What has been described is a proportional fluid amplifier cigarette inspection and rejection system that is very fast, being almost entirely without inertia, very reliable, being almost entirely without moving parts or friction, and adaptable to a wide range of inspection rates during operation of a given machine. The proportional nature of the device is very advantageous in that it simplifies the apparatus and also allows higher output pressures. Since the proportional fluid amplifier maintains any particular division of output between its output ports only as long as its control input directs same, no resetting arrangement is needed. When the control input pressure change reverts to normal, so does the output division between the output channels. Because of this, any number of stages can be cascaded, without increasingly complicated resetting circuitry. The increased cascading allows high output-stage outputs, so that pressure switch 105 can be operated directly and can be chosen to have a wide enough pressure actuation change to discriminate between various quantities of output at conduit 62, responding accurately only to those that meet a predetermined level, e.g., that move the diaphragm of the switch 105 a predetermined amount. With higher outputs, such an accurately discriminatory switch 105 is practical. The proportional nature of means 46 thereby affords simplicity and reliability of construction and operation.

The invention has been described with reference to a number of forms, but this was for illustration, not delineation. The illustrative apparatus can be varied in numerous ways within the scope of the invention. All embodiments, illustrated or not, that incorporate the principles of the invention are included within the claimed scope thereof.

What is claimed is:

1. Apparatus for inspecting cigarettes for leaks, comprising:
   (a) conveyor means for moving cigarettes along a normal path with at least a predetermined spacing between successive cigarettes;
   (b) a testing station extending along said path for a distance less than said predetermined spacing;
   (c) gas pressure means extending the full length of said station along said path for subjecting the interior of each passing cigarette to gas under a pressure different from the pressure outside the cigarette;
   (d) monitoring means for monitoring the leakiness of any cigarette in said testing station as represented by the gas pressure in the interior of said cigarette, comprising proportional fluid amplifier means including at least a first stage having,
      (i) a power stream,
      (ii) first and second output channels,
      (iii) a first control input adapted to divert said power stream to divide the flow thereof between said first and second output channels in varied proportions, said first control input being in communication with the gas pressure in the interior of the cigarette under test, and said first control input being located to divert a greater portion of said power stream flow to said second output channel in response to pressure in the interior of any cigarette under test corresponding to a leaky condition therein; said proportional fluid amplifier means providing a substantially immediate response at said second output channel to the condition of each cigarette entering the testing station and maintaining that response continuously until the cigarette leaves the testing station;
   (e) a control means within the testing station adjacent the discharge end thereof and responsive to a condition of the fluid in said second channel, said control means being shiftable between a cigarette-accepting position when the condition is within a predetermined range and a cigarette-rejecting position when the condition is outside said range; and
   (f) a plurality of ejecting means, one moving on the conveying means with each cigarette and actuatable to remove its associated cigarette from said normal path, each ejecting means being actuatable by the control means upon reaching the discharge end of the testing station, only if the control means is then in its cigarette-rejecting position.

2. Cigarette inspecting apparatus according to claim 1, wherein said first stage of fluid amplifier means further includes, a second control input opposed to said first control input so that the balance of pressures from said first and second control inputs determines said proportional division of power stream flow between said first and second output channels, said second control input being connected to an adjustable bias pressure source operable to adjust the level of output of said second output channel at which said control means shifts to its cigarette-rejecting position.

3. Cigarette inspecting apparatus according to claim 2, wherein said gas pressure means includes a source of gas under pressure, a conduit connected to said source, a throttle in said conduit producing a pressure drop between its upstream and downstream sides, means connecting said second control input to said conduit on the upstream side of said throttle, and means supplying said first control input with gas from said conduit on the downstream side of said throttle.

4. Cigarette inspecting apparatus according to claim 3, including conduit means supplying said first stage power stream from the upstream side of said throttle.

References Cited

UNITED STATES PATENTS

| | | | |
|---|---|---|---|
| 2,951,364 | 9/1960 | Sherrill | 73—45.2 |
| 3,187,763 | 6/1965 | Adams | 137—81.5 |
| 3,237,444 | 3/1966 | Kaeding et al. | 73—38 XR |
| 3,266,510 | 8/1966 | Wadey | 137—81.5 |
| 3,339,571 | 9/1967 | Hatch | 137—81.5 |

FOREIGN PATENTS

| | | |
|---|---|---|
| 1,205,434 | 11/1965 | Germany. |

LOUIS R. PRINCE, *Primary Examiner.*

M. J. NOLTON, *Assistant Examiner.*

U.S. Cl. X.R.

137—81.5